(12) United States Patent
Boyd et al.

(10) Patent No.: US 8,489,904 B2
(45) Date of Patent: Jul. 16, 2013

(54) ALLOCATING COMPUTING SYSTEM POWER LEVELS RESPONSIVE TO SERVICE LEVEL AGREEMENTS

(75) Inventors: William T. Boyd, Poughkeepsie, NY (US); Thomas J. Heller, Jr., Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 12/731,426

(22) Filed: Mar. 25, 2010

(65) Prior Publication Data

US 2011/0239015 A1    Sep. 29, 2011

(51) Int. Cl.
    *G06F 1/32* (2006.01)
(52) U.S. Cl.
    USPC .......................... 713/320; 718/102
(58) Field of Classification Search
    USPC .......................... 713/320; 718/102
    See application file for complete search history.

(56) References Cited

U.S. PATENT DOCUMENTS

| | | | |
|---|---|---|---|
| 5,142,684 A | 8/1992 | Perry et al. | |
| 7,093,147 B2 | 8/2006 | Farkas et al. | |
| 7,249,268 B2 | 7/2007 | Bhandarkar | |
| 7,308,591 B2 | 12/2007 | Dubinsky | |
| 7,526,661 B2 | 4/2009 | Nakajima et al. | |
| 8,112,648 B2 * | 2/2012 | Branover et al. | 713/320 |
| 8,381,215 B2 * | 2/2013 | Johnson et al. | 718/102 |
| 2005/0132239 A1 | 6/2005 | Athas et al. | |
| 2006/0123251 A1 | 6/2006 | Nakajima et al. | |
| 2006/0149985 A1 | 7/2006 | Dubinsky | |
| 2007/0079150 A1 | 4/2007 | Belmont et al. | |
| 2008/0184044 A1 | 7/2008 | Leech et al. | |

FOREIGN PATENT DOCUMENTS

| | | |
|---|---|---|
| EP | 1351117 A1 | 10/2003 |
| WO | WO0239242 | 5/2002 |

OTHER PUBLICATIONS

B. Lubin et al.; Expressive Power-Based Resource Allocation for Data Centers—"IJCAI '09 Proceedings of the 21st International Joint Conferences on Artificial Intelligence" 2009; pp. 1451-145; XP002623108.
K. Meng et al.; "Multi-Optimization Power Management for Chip Multiprocessors" Proceedings of the 17th International Conference; Oct. 25, 2008; pp. 177-186.
PCT/EP2010/067026—PCT Search Report—Dated Apr. 8, 2011.
PCT/EP2010/067026—Written Opinion—Dated Apr. 8, 2011.
PCT/EP2010/067044—PCT Written Opinion—Mar. 25, 2010.
PCT/EP2010/067044 PCT Search Report—Dated Mar. 25, 2010.
Steinder M. et al.; "Coordinated Management of Power Usage and Runtime Performance"; Network Operations and Management Symposium 2008; Apr. 7, 2008.

* cited by examiner

*Primary Examiner* — Albert Wang
(74) *Attorney, Agent, or Firm* — Cantor Colburn LLP; John Campbell

(57) ABSTRACT

A computer program product for initiating a task in a computer system including executing a method that includes receiving a task and a status of the task relative to a target service level. A current power state of the processor is determined. Execution of the task is initiated on the processor in response to the status indicating that the task is meeting the target service level and to the current power state being a low power state. It is determined if the processor can be moved into a high power state, the determining performed if the task is not meeting the target service level and the current power state is the low power state. If the processor can be moved into the high power state then the processor is moved into the high power state and execution of the task is initiated on the processor.

23 Claims, 4 Drawing Sheets

ALLOCATING COMPUTING SYSTEM POWER LEVELS RESPONSIVE TO SERVICE LEVEL AGREEMENTS

BACKGROUND

This invention relates generally to processing within a computing environment, and more particularly to minimizing power consumption while meeting service-level requirements in a computing environment.

Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the interconnect interface(s).

Extensive research and development efforts are invested by the industry, on an ongoing basis, to create improved and/or innovative solutions to maximize overall computer system performance and density by improving the system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the computer system design challenges, and include such items as ease of upgrade and reduced system environmental impact (such as space, power, and cooling). In addition, service level agreements (SLAs) may be in place to define a required level of service (e.g., delivery time, performance).

As the performance of processors continues to increase, the amount of power consumed by the processors is also likely to continue to increase. The amount of power that can be consumed by a given processor is often limited by a variety of factors such as the operating environment of the processor. Thus, improvements in processor performance may be gated by the additional power required by the processor to implement the improvements.

BRIEF SUMMARY

An exemplary embodiment is a computer program product for initiating a task in a computer system. The computer program product includes a tangible storage medium readable by a processing circuit and storing instructions for execution by the processing circuit for performing a method. The method includes receiving a task for execution by a processor and a status of the task relative to a target service level. A current power state of the processor is determined. Execution of the task is initiated on the processor in response to the status indicating that the task is meeting the target service level and to determining that the current power state is a low power state. The method further includes, in response to the status indicating that the task is not meeting the target service level and to determining that the current power state is the low power state: determining if the processor can be moved into a high power state; moving the processor into the high power state in response to determining that the processor can be moved into the high power state; and initiating execution of the task on the processor in response to moving the processor into the high power state.

Another exemplary embodiment is a system for initiating a task in a computer system. The system includes a computer memory and an instruction processing element in communication with the computer memory. The instruction processing element includes an instruction fetching element for fetching instructions from memory and one or more execution elements for executing fetched instructions. The computer system is configured to perform a method that includes receiving a task for execution by a processor and a status of the task relative to a target service level. A current power state of the processor is determined. Execution of the task is initiated on the processor in response to the status indicating that the task is meeting the target service level and to determining that the current power state is a low power state. The method further includes, in response to the status indicating that the task is not meeting the target service level and to determining that the current power state is the low power state: determining if the processor can be moved into a high power state; moving the processor into the high power state in response to determining that the processor can be moved into the high power state; and initiating execution of the task on the processor in response to moving the processor into the high power state.

A further exemplary embodiment is a computer implemented method for initiating a task in a computer system. The method includes receiving a task for execution by a processor and a status of the task relative to a target service level. A current power state of the processor is determined. Execution of the task is initiated on the processor in response to the status indicating that the task is meeting the target service level and to determining that the current power state is a low power state. The method further includes, in response to the status indicating that the task is not meeting the target service level and to determining that the current power state is the low power state: determining if the processor can be moved into a high power state; moving the processor into the high power state in response to determining that the processor can be moved into the high power state; and initiating execution of the task on the processor in response to moving the processor into the high power state.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
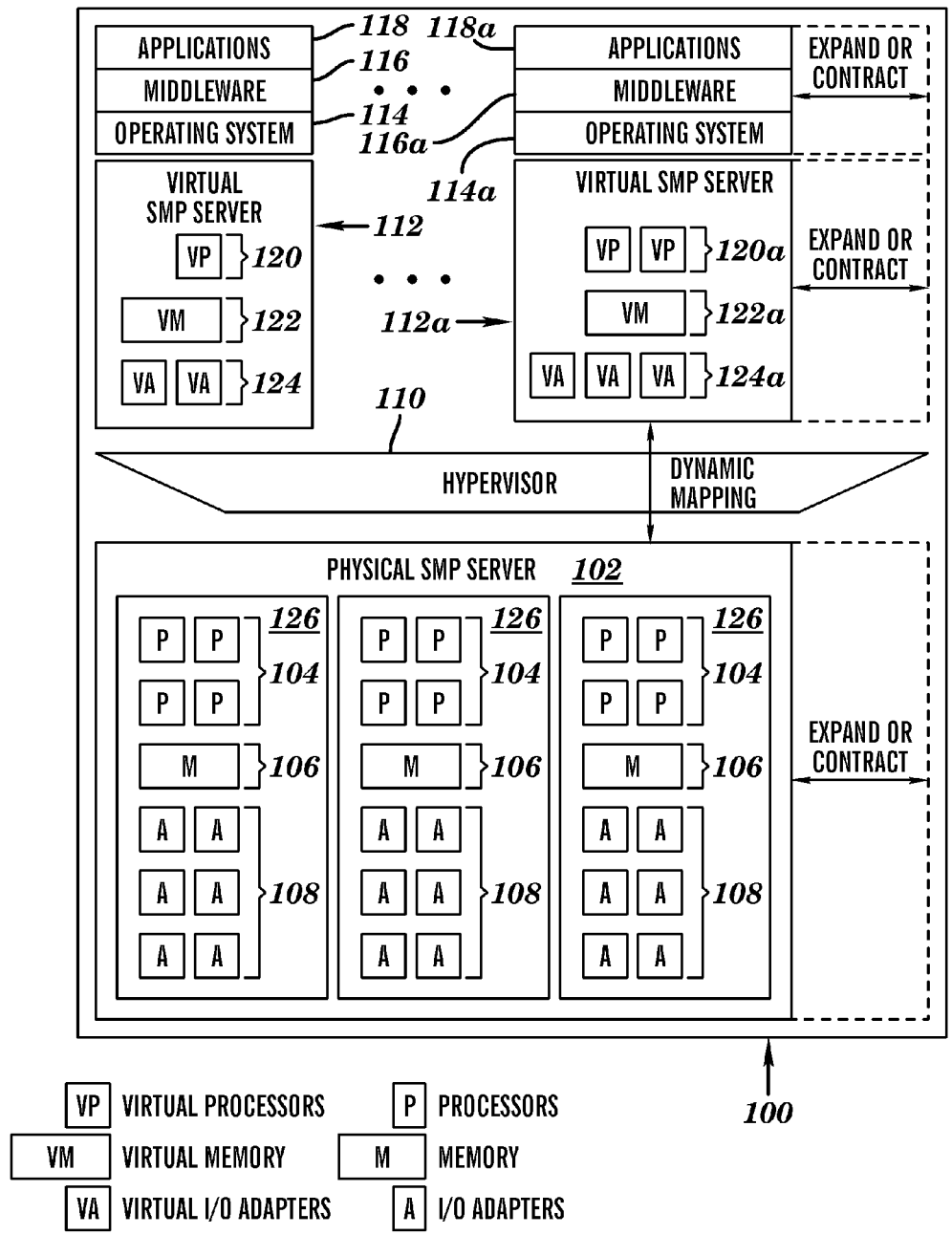
FIG. 1 depicts a block diagram of a data processing system that may be implemented by an exemplary embodiment.

An exemplary embodiment of the present invention utilizes a service level agreement (SLA) associated with a task as input to a decision about the amount of power to be allocated for performing the task. In an exemplary embodiment, a dispatch process receives a task to be executed as well as information about whether the task is currently meeting a SLA associated with the task. In an exemplary embodiment, if the task is not currently meeting the SLA, the task will be executed on the processor if the processor is in (or can be moved to) a high power state. If the processor cannot be moved to a high power state, then the task will be sent to another processor (e.g., one capable of operating in a high power state) for execution. In this manner, those tasks that require faster execution to meet an SLA will be initiated on processors that are in high power states.

In an exemplary embodiment, multiple processor chips with different silicon optimizations are utilized to obtain the best power/performance for the entire system. In an exemplary embodiment, the dispatch process includes a check of a target service level required by a SLA. If a current service level falls short of the SLA for a specific process thread, or task, then the dispatch process checks the power state of the current core. The dispatch process then decides whether to continue processing on the current core or to move the processing to another core.

As used herein, the term "power/performance" refers to a measurement of the efficiency of power consumption (e.g., electrical power consumption) in a computer system such as a multiprocessor system or a processor.

As used herein the term "task" refers to a thread, or a group of threads. An SLA may be associated with a single task or it may be associated with a group of tasks (e.g., an application, a computer system).

As used herein the term "service level agreement" or "SLA" refers to a negotiated agreement between a customer and a service provider that describes a common understanding about services, priorities, responsibilities, guarantees, and warranties. A SLA may specify attributes of the service such as, but not limited to: availability, serviceability, performance, and operation of the service. In some cases, a level of service is specified as a target, in other cases as a minimum. In an exemplary embodiment, a SLA specifies a response time, where the response time is defined as the elapsed time between receiving a request and servicing the request. The response times relative to the SLA are then tracked using any manner known in the art. In an exemplary embodiment, the IBM® Enterprise Workload Manager™ is used to track the response times (and any other service attributes associated with the SLA).

Optimizing a large multiprocessor system for peak performance per watt is often difficult with contemporary software and hardware. Systems may include multiple processing elements that have a variety of power/performance operating points (also referred to herein as "power states") packaged together in a single package or connected via cache coherent links among multiple packages. Current dispatching algorithms are used to dispatch processes to processing elements based upon the goal of achieving peak performance.

Current multi-processor computing systems may not always provide the best throughput for a given amount of power. Some contemporary computing systems use a single microprocessor core design and use dynamic voltage scaling to change the performance per Watt during various time periods while executing applications. Other contemporary systems include multiple cores with differing instruction set architectures to provide a performance advantage for certain applications. These systems have not been optimized to provide the best throughput per Watt while executing binary compatible application code across many microprocessor cores (cores are also referred to herein as "processors"). One reason is that the dispatcher does not take advantage of the performance differences between cores in a system and does not optimize their utilization.

Exemplary embodiments of the present invention work to optimize the overall power-performance of the system while running a variety of workloads. In an exemplary embodiment, multiple multi-processor systems are used together to provide a computing system that optimizes the total system throughput per Watt. Exemplary embodiments include a multi-processor system made up of processors that span two or more chips (also referred to herein as "integrated circuits" or "microprocessor chips"). These chips are of different types and are able to execute the same binary software but differ in their performance per Watt characteristics. Computing system architectures such as the Intel® IA-32 (Intel Architecture, 32-bit) architecture, and the IBM Power Architecture® are used for a very wide variety of computing systems. There are many binary compatible processing core designs already available for each of these architectures. Each of these core designs has different power/performance characteristics. Exemplary embodiments will allow better overall power/performance when running multiple processes on a single multi-processor server. By using multiple chips with varying performance and power optimizations, the system throughput per Watt can be increased. Contemporary microprocessor offerings indicate a range of up to 2× performance at the cost of up to 4.5-5× power/performance. This range can be expanded further with additional silicon tuning, device tuning, and circuit choices. Given the opportunity to use multiple multi-processor chips and multiple power performance points of the chips, exemplary embodiments optimize the dispatching of threads to cores in order to maximize the power/performance capability of the system.

In an exemplary embodiment, multiple chips are connected via interconnect busses, potentially through a node controller. A subset of the chips are implemented with a silicon process that has been optimized for high speed at the cost of high power while the majority of chips are implemented with a silicon process optimized for power; both of these chip types are capable of running identical binaries. An exemplary embodiment combines these heterogeneous processors into a symmetric multi-processing (SMP) system with dispatching algorithms tailored to optimize the power/performance. If the service-level agreement (SLA) requirements (or other system requirements) of the processes can be met without the use of the high-performance, high-power processor, then power gating controls provided by exemplary embodiments are used to minimize both active and leakage power of the processor.

When required, a high-performance, high-power core is powered on through the power gating controls and high priority processes are dispatched to this processor (which is in a high power state). In an exemplary embodiment this is accomplished via a novel hypervisor or operating system software that uses SLAs and/or a table of the current state of the multi-processor system that includes a mapping of which cores are high-performance versus power-optimized and which cores are currently powered on. In an optimal power/performance case, all high-powered cores are powered off and they are powered on only as required to meet the SLAs (or other system requirements).

As an example, on a power-optimized core, a thread finishes its current timeslice, indicated by timer interrupt, and the dispatcher is invoked. The dispatcher code includes a periodic check of the quality of service, or current service level. In this example it is determined that a potential quality of service issue has arisen. This information is used to determine which thread should be the next thread to be dispatched. It may be determined that a high-performance core should be used. The dispatcher determines whether enough high-performance hardware cores are available (and powered on) for the combination of the currently running threads and this new thread that has hit a potential quality of service problem. In some cases, the dispatcher signals the system control code that a high-performance core should be powered on in order to increase the hardware available to meet the SLAs of all the threads in the system. The dispatcher may choose another waiting thread if available. In an exemplary embodiment, this thread would be the highest priority among those threads that are currently meeting their quality of service level. In an alternate exemplary embodiment, currently running low priority threads may be interrupted on a number of cores in order to free up enough thermal overhead to enable the system to turn on the additional high powered core.

An exemplary embodiment uses a set of software tables controlled by the hypervisor or operating system that include an indication of which threads are waiting to be dispatched on high-power/high-performance cores. Other information may include the current status of all of the cores in the system; specifically, which cores are high-performance and their location, and which cores are currently powered on. The resulting system will have a varying number of hardware threads available to the dispatcher; this number of threads will by dynamically changed by the hypervisor and/or operating system in order to meet the SLA requirements.

FIG. 1 is a block diagram of a data processing system 100 in which an exemplary embodiment of the present invention may be implemented. In an exemplary embodiment, system 100 is a symmetric multiprocessing (SMP) server computer system. The SMP server computer system 100 depicted in FIG. 1 includes physical hardware devices that can be mapped to, i.e. temporarily owned by, a user application to execute that application.

SMP server computer system 100 includes a physical SMP server 102 that includes physical hardware devices such as processors 104, memory 106, and I/O adapters 108. These physical devices are managed by a hypervisor 110 that resides on the physical SMP server computer system 100. As depicted in FIG. 1, the physical SMP server 102 is implemented by one or more microprocessor chips 126. Though shown in FIG. 1 as having similar configurations, the microprocessor chips 126 within the physical SMP server may have different configurations (e.g., different number of processors 104, different types of processors 104).

As used herein, the term "microprocessor chip" 126 refers to a device that is fabricated using a single piece of silicon. The microprocessor chip 126 may also be called a chip or an integrated circuit. One or more hardware elements are fabricated on the single microprocessor chip. The hardware elements generally include processors 104 (or processing cores), memories 106 (e.g., cache memories), I/O adapters 108, but may also include special functional elements such as compression engines, encryption engines, protocol processing engines, architecture emulation engines, and data stream processing engines.

A virtual server is a proxy for a physical server that has the same capabilities, interfaces, and state. Virtual servers are created and managed by the hypervisor 100 and each virtual server appears to be a physical SMP server to its user (e.g., an operating system, middleware, and application software that run on it). The SMP server computer system 100 depicted in FIG. 1 includes one or more virtual servers such as virtual server 112 and virtual server 112a. Each virtual server 112 appears to its software to include its own processor(s), memory, and I/O adapter(s) that are available for the exclusive use of that virtual server 112. For example, virtual server 112 includes a virtual processor 120, virtual memory 122, and virtual I/O adapters 124. Virtual server 112a includes virtual processors 120 a, virtual memory 122 a, and virtual I/O adapters 124a.

Each virtual server 112 supports its own software environment, including an operating system, middleware, and applications. The software environment of each virtual server 112 can be different from the software environment of other virtual servers. In an exemplary embodiment, the operating systems executed by each virtual server may differ from one another. For example, virtual server 112 supports operating system 114, middleware 116, and applications 118. Virtual server 112 a supports operating system 114a, middleware 116a, and applications 118a. Operating systems 114 and 114a may be the same or different operating systems.

A virtual server 112 is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. The hypervisor 110 manages the selections of physical devices and their temporary assignment to virtual devices.

The hypervisor 110 is responsible for dynamically creating, managing, and destroying virtual SMP servers. Whole virtual processors, virtual I/O adapters, and virtual memory blocks can be removed or added by hypervisor 110. The hypervisor 110 is also responsible for dynamic resource allocation, managing time-sharing of physical resources, and altering the physical resource mapped to a processor without involving the operating system. The hypervisor 110 is also able to dedicate physical resources to virtual resources for situations where sharing is not desired. The hypervisor 110 is responsible for managing the addition or removal of physical resources. The hypervisor 110 makes these additions and deletions transparent to the upper level applications.

Figure 2:
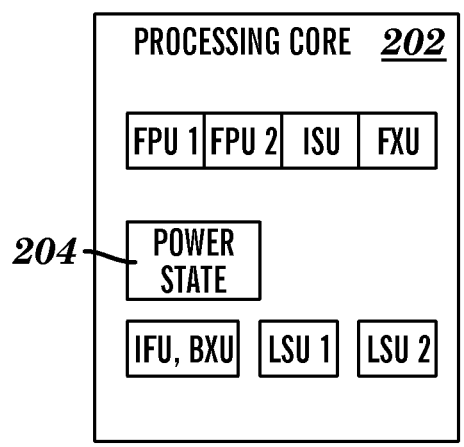
FIG. 2 depicts a block diagram of an integrated circuit that may be implemented by an exemplary embodiment.

FIG. 2 is a block diagram of a processor 104, referred to in FIG. 2 as a processing core 202 located on a microprocessor chip 126, that may be implemented by an exemplary embodiment. The exemplary processing core 202 depicted in FIG. 2 includes a power state register 204. In an exemplary embodiment the power state register 204 stores a current power state of the processor (e.g., low power state, high power state) as well as a flag (or other indicator) that indicates if the processor can be moved into a high power state. In an alternate exemplary embodiment, the flag and the current power state are stored in separate registers. The flag may be set based on physical capabilities of the processor 104 as well as limits imposed by the operating environment. Both the power state and flag may be set by the processing core 202 or by an external control program (e.g., a power control module located on the microproessor chip 126, the hypervisor 110, etc.).

The processing core 202, as depicted in FIG. 2, may also include multiple sub-elements such as one or more floating point units, one or more load/store units, an instruction sequencing unit, a fixed point execution unit, an instruction fetch/branch execution unit, and possibly other sub-elements.

The terms "processing core" and "processor" are used interchangeably herein to refer to the same device. As used herein, the term "physical processor" refers to a processing core and may include other hardware elements that are either dedicated to that core or shared by multiple cores. Thus, a physical processor is a processing core and hardware elements that are either dedicated to or shared by that processing core.

As used herein, the term "current power state" refers to the current power state of a processor. In an exemplary embodiment the current power state is a high power state or a low power state. As used herein, the term "high power state" refers to a processing core 202 that has been placed in a high clock frequency mode and the power state register 204 has been updated to reflect this mode. As used herein the term "high power core" refers to a processing core 202 that is executing in a high power state. As used herein, the term "low power state" refers to a processing core 202 that has been placed in a low clock frequency mode and the power state register 204 has been updated to reflect this mode. An exemplary embodiment uses changes in the core clock frequency as the means to adjust the power/performance of the various processing cores in the system. It should be understood that any other methods of adjusting the power/performance of the core may be used instead of, or in addition to, this clock frequency control. Adjustments of the power/performance of the core are referred to herein as "moving" the processor into a particular power state. Moving the processor from a low power state into a high power state includes altering the operating frequency setting in the clock control logic to a higher frequency setting. Any suitable clock control mechanism may be used. Exemplary embodiment utilize two settings: high (e.g., 4 GHz) and low (e.g., 3 GHz). Alternate embodiments include several possible frequency settings and additional logic to determine the number of steps to be increased on the frequency scale. Similarly, moving the processor from a high power state into a low power state includes altering the operating frequency setting in the clock control logic to a lower frequency setting.

The power state register 204 indicates the power/performance state of the processing core 202 and can be read by a software instruction (e.g., the dispatcher) to determine a current power state of the processing core 202. In an exemplary embodiment, the power state register 204 is written by power management software that has control of the power/performance parameters of the processing cores in the system. If the power mode of the processing core 202 is changed, then the power state register 204 is updated. In an exemplary embodiment, the implementation of the power state register 204 is similar to a special purpose register and/or is written by a diagnose instruction. In an alternate exemplary embodiment, the power state register 204 is located in a register external to the processing core 202 or stored as one or more bits in a memory.

Figure 3:
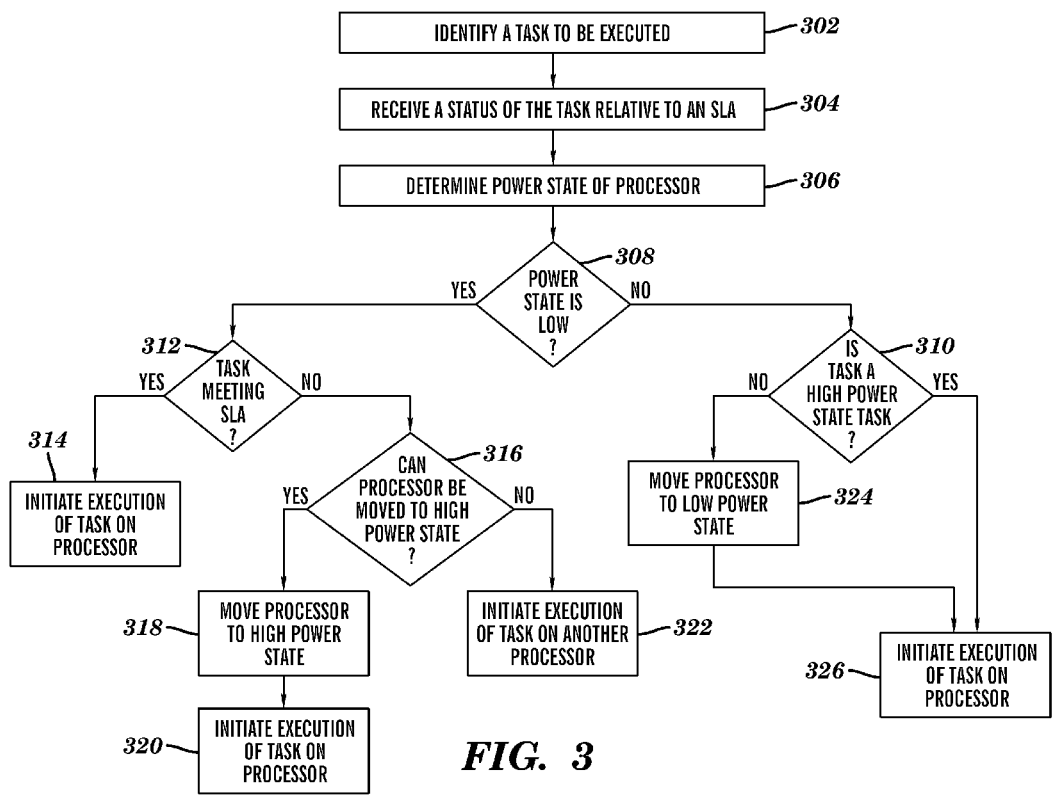
FIG. 3 depicts a process flow of a dispatch algorithm that may be implemented by an exemplary embodiment.

FIG. 3 depicts a process flow of a dispatch algorithm that may be implemented by an exemplary embodiment. In an exemplary embodiment, the algorithm is executed by the hypervisor 110 which is responsible for implementing the virtual servers in a data processing system, including managing the time-sharing of physical processors among many different virtual processors. In an exemplary embodiment, the dispatch algorithm in the hypervisor 110 initiates the execution of the tasks.

At block 302, a task to be executed on a processor (e.g., processor core 202) is selected. In an exemplary embodiment, a ready queue includes one or more tasks that are ready for execution, and the hypervisor selects a task from the redy queue (e.g., the next task) for execution on the processor. The selected task is received by the dispatch process. At block 304, a status of the task relative to a target service level, or SLA, is received. At block 306, the power state of the processor is determined. In an exemplary embodiment, the power state is determined by reading the power state register 204 located on the processing core 202. In another exemplary embodiment, the hypervisor 110 keeps track of the current power state of the processor and/or the current power state is stored in memory 106.

At block 308, it is determined if the current power state of the processor is the low power state. If the current power state is low, then block 312 is performed to determine a status of the task relative to a target service level associated with the task. In an exemplary embodiment, the target service level is defined in a SLA that is associated with the task. In an exemplary embodiment, the hypervisor determines the status of the task relative to the SLA. In an exemplary embodiment, the status of the task relative to the SLA is tracked using a tool such as the IBM Enterprise Workload Manager that is executing in a parallel with the dispatcher. Data from the tool is made available to the hypervisor for use in performing step 312.

In an exemplary embodiment, the target service level for the task is being met if the current service level associated with the task is within a threshold of the target service level. For example, if the SLA specifies a service level of one hundred transactions per second, the threshold is three, and a current service level is ninety eight transactions per second, then the target service level is being met because the current service level (ninety eight transactions per second) is within three transaction of the target. In this example, the status of the task relative to the target service level will indicate that the task is meeting the target service level.

In an exemplary embodiment, the hypervisor determines the status of the task relative to the SLA based on a prediction of an impact to the current service level if the task is executed on the processer while the processor is in the low power state. If it is predicted that the current service level will no longer meet the target service level, then the status is set to indicate that the task is not meeting the target service level. This capability allows the dispatcher to be proactive about meeting the SLA associated with the task.

If it is determined at block 312 that the target service level is being met, then block 314 is performed to initiate execution of the task on the processor. If the target service level is not being met, then block 316 is performed to determine if the processor can be moved to a high power state. In an exemplary embodiment, this is determined by reading a flag in the power state register 204. In other exemplary embodiments, the hypervisor 110 keeps track of the ability of the processor to move into a high power state and/or the flag is stored in memory 106.

If the processor can be moved into a high power state, then block 318 is performed to move the processor into the high power state. The execution of the task is then initiated on the processor at block 320. If the processor cannot be moved into a high power state, as determined at block 316, then block 322 is performed to initiate execution of the task on another processor. In an exemplary embodiment, the dispatcher verifies that the other processor is in the high power state prior to initiating execution of the task on the other processor. In an exemplary embodiment, if the other processor is in the low power state, the dispatcher verifies that the other processor is capable of being moved into the high power state prior to initiating execution of the task on the other processor. In an exemplary embodiment, the initiating performed by marking (or storing) in memory accessible by the hypervisor, an indicator specifying that the task should be executed on a processor that is in a high power state. In an exemplary embodiment, a processor that is in the high power state is interrupted, followed by the dispatch code in the hypervisor being invoked to initiate execution of the task.

If it is determined at block 308, that the processor is not in a low power state, then block 310 is performed to determine if the task is a high power state task. In an exemplary embodiment, an input to the determination at block 310 is whether or not the target service level is being met. If target service level is currently not being met, then the task is a high power state task; and if the target service level is currently being met or exceeded, then the task is not a high power state task. If the task is a high power state task, then block 326 is performed to initiate execution of the task on the processor. If it is determined, at block 310, that the task is not a high power state task, then block 324 is performed to move the processor into a low power state. In this manner, the dispatcher can limit the amount of power used by the system by executing the task in a low power state when the extra power is not required to meet the SLA.

In a further exemplary embodiment, more than two power state paths are supported. For example, there may be three different paths, one for a high, medium, and low power state.

Technical effects and benefits include the ability to improve power efficiency by providing the amount of power required to meet a service level as defined in an SLA. The amount of power utilized by a task can be targeted based on the service level defined in the SLA. If the SLA is being met or exceeded, the task can be executed on a processor in a low power state. If the SLA is not being met or close to not being met (as defined by a threshold), the task can be executed on a processor in a high power state. Predictive data can also be input to the decision about whether to execute the task on a processor in a high power state or a low power state. This may lead to a decrease in power usage or in an increase in the amount of processing that can be performed by the system while still meeting the SLA requirements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
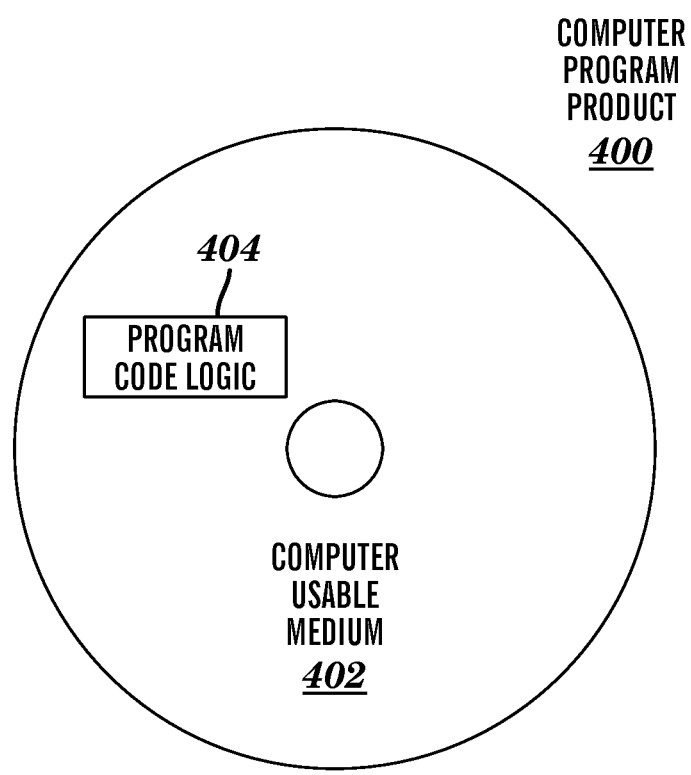
FIG. 4 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 400 as depicted in FIG. 4 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer program product for initiating a task in a computer system, the computer program product comprising:
 a non-transitory tangible storage medium readable by a processing circuit and storing instructions for execution by the processing circuit for performing a method comprising:
 receiving a task for execution by a processor;
 receiving a status of the task relative to a target service level;
 determining a current power state of the processor;
 initiating execution of the task on the processor based on the status indicating that the task is meeting the target service level and to determining that the current power state is a low power state; and
 based on the status indicating that the task is not meeting the target service level and to determining that the current power state is the low power state:
 determining whether the processor can be moved into a high power state;
 moving the processor into the high power state based on determining that the processor can be moved into the high power state; and
 initiating execution of the task on the processor based on moving the processor into the high power state.

2. The computer program product of claim 1, wherein the status indicates that the target service level is being met when a current service level associated with the task is within a threshold of the target service level and the status indicates that the target service level is not being met when the current service level associated with the task is not within the threshold of the target service level.

3. The computer program product of claim 2, wherein the method further comprises predicting that the current service level associated with the task will not be within the threshold of the target service level based on the task being executed in the low power state and setting the status to indicate that the task is not meeting the target service level based on the predicting.

4. The computer program product of claim 1, wherein the target service level is included in a service level agreement (SLA) associated with the task.

5. The computer program product of claim 1, wherein the method further comprises initiating execution of the task on an other processor based on the status indicating that the task is not meeting the target service level, to determining that the current power state is the low power state, and to determining that the processor cannot be moved into the high power state.

6. The computer program product of claim 5, wherein the initiating execution of the task on the other processor is performed using an interrupt.

7. The computer program product of claim 5, wherein the method further comprises determining whether the other processor is in the high power state, wherein the initiating execution of the task on the other processor is further based on determining that the other processor is in the high power state.

8. The computer program product of claim 1, wherein the method further comprises collecting data about a current service level associated with the task and setting the status based on the collected data and to the target service level.

9. The computer program product of claim 1, wherein the method further comprises:
   moving the processor into the low power state based on the status indicating that the task is meeting the target service level and to determining that the current power state is the high power state; and
   initiating execution of the task on the processor based on moving the processor into the low power state.

10. A system for initiating a task in a computer system, the system comprising:
   a computer memory; and
   an instruction processing element in communication with the computer memory, the instruction processing element comprising an instruction fetching element for fetching instructions from memory and one or more execution elements for executing fetched instructions;
   wherein the computer system is configured to perform a method comprising:
      receiving a task for execution by the processor;
      receiving a status of the task relative to a target service level;
      determining a current power state of the processor;
      initiating execution of the task on the processor based on the status indicating that the task is meeting the target service level and to determining that the current power state is a low power state; and
      based on the status indicating that the task is not meeting the target service level and to determining that the current power state is the low power state:
         determining whether the processor can be moved into a high power state;
         moving the processor into the high power state based on determining that the processor can be moved into the high power state; and
         initiating execution of the task on the processor based on moving the processor into the high power state.

11. The system of claim 10, wherein the system further comprises a power state register for storing the current power state of the processor, and the determining the current power state comprises reading the current power state from the power state register.

12. The system of claim 10, wherein the system further comprises a power state register for storing a flag indicating whether the processor can be moved into a high power state, and the determining whether the processor can be moved into the high power state comprises reading the flag from the power state register.

13. The system of claim 10, wherein the status indicates that the target service level is being met when a current service level associated with the task is within a threshold of the target service level and the status indicates that the target service level is not being met when the current service level associated with the task is not within the threshold of the target service level.

14. The system of claim 13, wherein the method further comprises predicting that the current service level associated with the task will not be within the threshold of the target service level based on the task being executed in the low power state and setting the status to indicate that the task is not meeting the target service level based on the predicting.

15. The system of claim 10, wherein the target service level is included in a service level agreement (SLA) associated with the task.

16. The system of claim 10, wherein the method further comprises initiating execution of the task on an other processor based on the status indicating that the task is not meeting the target service level, to determining that the current power state is the low power state, and to determining that the processor cannot be moved into the high power state.

17. The system of claim 16, wherein the initiating execution of the task on the other processor is performed using an interrupt.

18. The system of claim 10, wherein the method further comprises:
   moving the processor into the low power state based on the status indicating that the task is meeting the target service level and to determining that the current power state is the high power state; and
   initiating execution of the task on the processor based on moving the processor into the low power state.

19. A computer implemented method for initiating a task in a computer system, the method comprising:
   receiving a task for execution by a processor;
   receiving a status of the task relative to a target service level;
   determining a current power state of the processor;
   initiating execution of the task on the processor based on the status indicating that the task is meeting the target service level and to determining that the current power state is a low power state; and
   based on the status indicating that the task is not meeting the target service level and to determining that the current power state is the low power state:
      determining whether the processor can be moved into a high power state;
      moving the processor into the high power state based on determining that the processor can be moved into the high power state; and
      initiating execution of the task on the processor based on moving the processor into the high power state.

20. The method of claim 19, wherein the status indicates that the target service level is being met when a current service level associated with the task is within a threshold of the target service level and the status indicates that the target service level is not being met when the current service level associated with the task is not within the threshold of the target service level.

21. The method of claim 19, wherein the target service level is included in a service level agreement (SLA) associated with the task.

22. The method of claim 19, further comprising initiating execution of the task on an other processor based on the status indicating that the task is not meeting the target service level, to determining that the current power state is the low power state, and to determining that the processor cannot be moved into the high power state.

23. The method of claim 22, wherein the initiating execution of the task on the other processor is performed using an interrupt.

* * * * *